(12) United States Patent
Biggs

(10) Patent No.: US 8,534,530 B2
(45) Date of Patent: Sep. 17, 2013

(54) INFLATABLE RING FOR SUPPORTING FRICTION WELDING WORKPIECES, AND ASSOCIATED SYSTEMS AND METHODS

(75) Inventor: David M. Biggs, Kent, WA (US)

(73) Assignee: Blue Origin, LLC, Kent, WA (US)

(*) Notice: Subject to any disclaimer, the term of this patent is extended or adjusted under 35 U.S.C. 154(b) by 0 days.

(21) Appl. No.: 13/456,118

(22) Filed: Apr. 25, 2012

(65) Prior Publication Data

US 2012/0298725 A1 Nov. 29, 2012

Related U.S. Application Data

(60) Provisional application No. 61/479,771, filed on Apr. 27, 2011.

(51) Int. Cl.
*B23K 20/12* (2006.01)
*B23K 37/00* (2006.01)

(52) U.S. Cl.
USPC ........... 228/2.1; 228/5.5; 228/44.5; 228/49.3; 228/184

(58) Field of Classification Search
None
See application file for complete search history.

(56) References Cited

U.S. PATENT DOCUMENTS

| | | | | |
|---|---|---|---|---|
| 3,166,837 A | * | 1/1965 | Frick et al. | 29/421.1 |
| 3,233,315 A | * | 2/1966 | Levake | 29/237 |
| 3,253,323 A | * | 5/1966 | Saueressig et al. | 492/4 |
| 3,825,167 A | | 7/1974 | Komorek et al. | |
| 4,084,739 A | * | 4/1978 | Koltz et al. | 228/168 |
| 4,154,641 A | * | 5/1979 | Hotton | 156/580 |
| 4,889,276 A | * | 12/1989 | Cadwell et al. | 228/265 |
| 5,390,846 A | | 2/1995 | Thode | |
| 5,435,478 A | | 7/1995 | Wood et al. | |
| 5,575,402 A | | 11/1996 | Botsolas | |
| 6,199,745 B1 | | 3/2001 | Campbell et al. | |
| 6,450,395 B1 | | 9/2002 | Weeks et al. | |
| 6,488,323 B1 | * | 12/2002 | Bouligny | 294/119.3 |
| 6,742,697 B2 | | 6/2004 | McTernan et al. | |
| 6,908,690 B2 | | 6/2005 | Waldron et al. | |
| 7,448,528 B2 | | 11/2008 | Forrest et al. | |
| 7,461,769 B2 | | 12/2008 | Waldron et al. | |
| 7,464,852 B2 | | 12/2008 | Waldron et al. | |
| 7,674,418 B2 | * | 3/2010 | Matsumoto et al. | 264/314 |
| 7,748,592 B2 | | 7/2010 | Koga et al. | |
| 2002/0190103 A1 | | 12/2002 | Yoshinaga | |
| 2004/0129763 A1 | | 7/2004 | Burford et al. | |
| 2008/0256960 A1 | | 10/2008 | Greason et al. | |
| 2010/0213244 A1 | | 8/2010 | Miryekta et al. | |

FOREIGN PATENT DOCUMENTS

| | | |
|---|---|---|
| EP | 0193812 A3 | 4/1987 |
| EP | 2308636 B1 | 5/2012 |
| GB | 2447278 B | 12/2011 |

OTHER PUBLICATIONS

Extended European Search Report for European Patent Application No. 12165960.1, Applicant: Blue Origin, LLC, mailed Sep. 19, 2012, 9 pages.

* cited by examiner

*Primary Examiner* — Kiley Stoner
(74) *Attorney, Agent, or Firm* — Perkins Coie LLP

(57) ABSTRACT

Inflatable rings for supporting friction welding workpieces, and associated systems and methods. A support assembly for joining multiple workpieces in a representative embodiment includes a carriage and a generally ring-shaped support member that in turn includes a body and at least one inflatable member carried by the body and positioned to expand from a first configuration to a second configuration.

16 Claims, 13 Drawing Sheets

US 8,534,530 B2

INFLATABLE RING FOR SUPPORTING FRICTION WELDING WORKPIECES, AND ASSOCIATED SYSTEMS AND METHODS

CROSS-REFERENCE TO RELATED APPLICATION

The present application claims priority to U.S. Provisional Patent Application 61/479,771, filed on Apr. 27, 2011 and incorporated herein by reference.

TECHNICAL FIELD

The present disclosure is directed generally to inflatable rings for supporting friction welding workpieces, and associated systems and methods.

BACKGROUND

Friction stir welding (FSW) is a technique used to weld metal by generating friction at an interface between the welded components, typically with a rotating spindle. This technique has been used in the aerospace industry to weld large components, for example, rocket fuel tanks. While conventional friction stir welding techniques have proven successful, there is a continual need in the industry to improve the efficiency and reduce the cost associated with purchasing and operating these high-value devices.

DETAILED DESCRIPTION

Aspects of the present disclosure are directed generally to modular friction welding heads and associated systems and methods. Specific details of several embodiments of the disclosure are described below with reference to manufacturing a rocket fuel tank to provide a thorough understanding of these embodiments. In other embodiments, these techniques can be used to form other devices. Several details describing structures or processes that are well-known and often associated with friction welding are not set forth in the following description for purposes of brevity. Moreover, although the following disclosure sets forth several embodiments of the invention, several other embodiments can have different configurations or different components than those described in this section. Accordingly, other embodiments may include additional elements and/or may lack one or more of the elements described below with reference to FIGS. 1-12.

Figure 1:
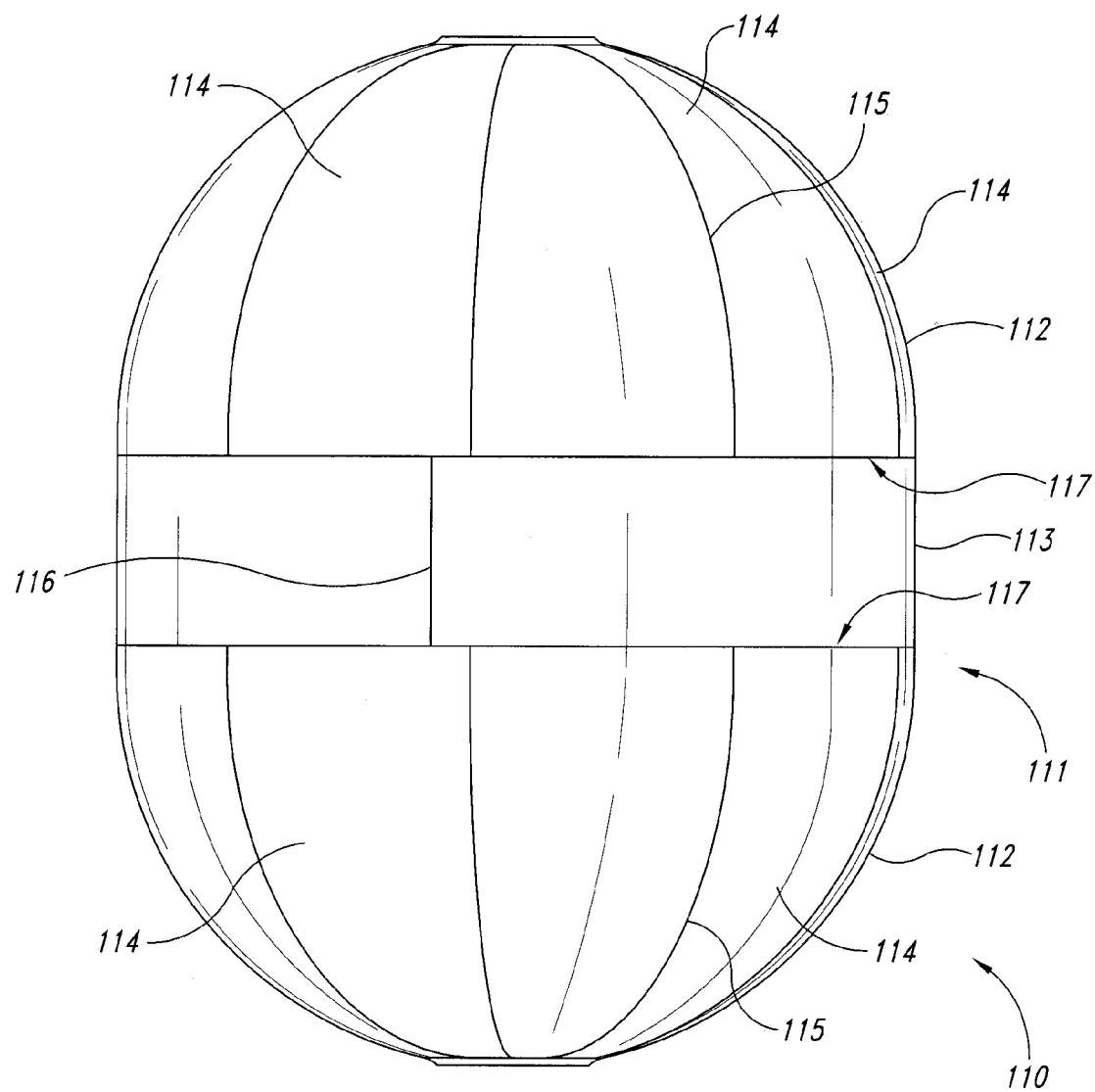
FIG. 1 is a partially schematic side view of a fuel tank that can be formed using techniques and systems in accordance with one or more embodiments of the present disclosure.

FIG. 1 is a partially schematic, side view of a product 110 that can be formed using techniques and devices described further below. In a particular aspect of this embodiment, the product 110 can include a fuel tank 111, for example, a fuel tank suitable for liquid-fueled rockets. The fuel tank 111 can include a cylinder or cylindrical portion 113 connected to oppositely facing domes 112. The cylinder 113 can be formed from a rolled sheet that is welded at a cylinder weld 116. Each of the domes 112 can be formed from multiple gores 114 (each having a partially spherical surface) that are joined to each other at corresponding gore welds 115. Each of the domes 112 is then attached to the intermediate cylinder 113 at a corresponding dome/cylinder weld 117.

Figure 2A:
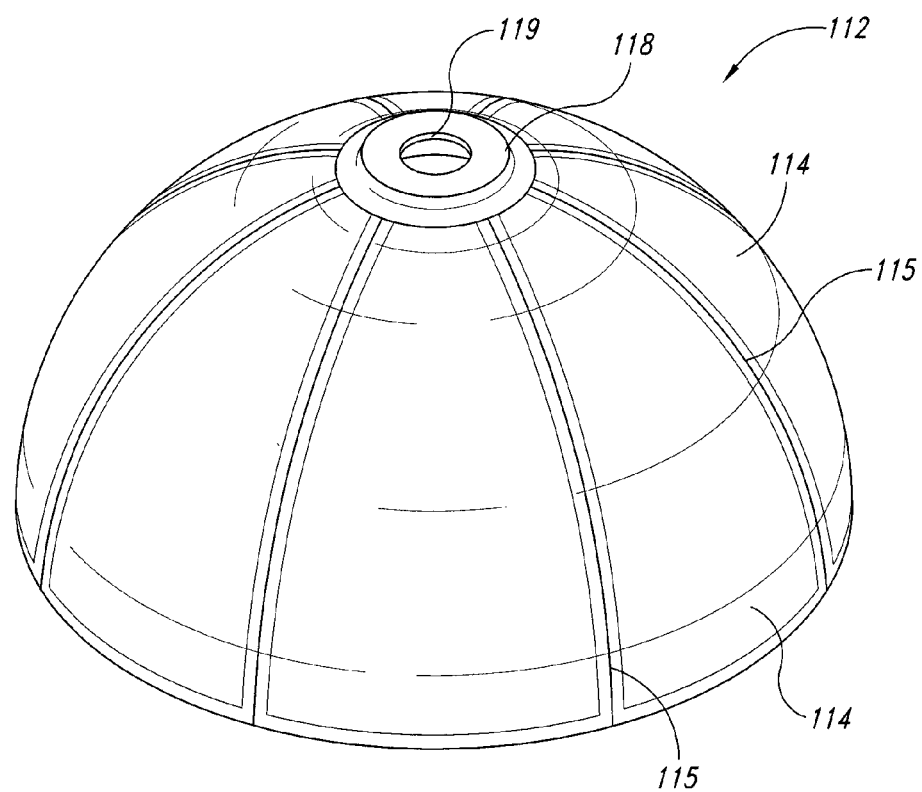
FIGS. 2A-2B are partially schematic illustrations of a fuel tank dome and associated components that can be welded using techniques in accordance with embodiments of the disclosure.

FIG. 2A schematically illustrates portions of the dome 112 shown in FIG. 1, including the gores 114 and the associated gore welds 115. In a particular embodiment, a polar flange 118 (shown in cross-section in FIG. 2B) can be attached to the upwardly facing end of the dome 112, for example, to support attachments to other structures. These attachments can include structural attachments, fuel lines and/or other elements. The polar flange 118 can include a central opening 119 for access into the dome 112.

Figure 2B:
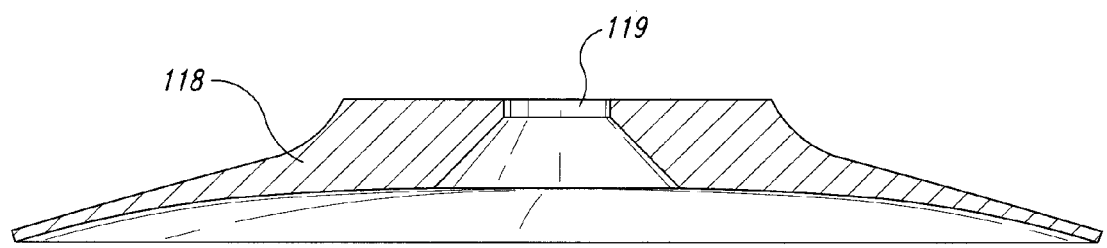

Conventional friction welding techniques typically require three different stations to assemble the fuel tank shown in FIGS. 1 and 2A-2B. These stations include a first station at which the individual gores are welded to form the domes 112, a second station at which the cylinder 113 is welded at the cylinder weld 116, and a third station at which the domes 112 are attached to the cylinder 113 at the dome/cylinder welds 117. Because each of the foregoing components is typically large and has a high value, each of the foregoing stations typically includes a dedicated friction welding head and controller that are specifically designed only for the particular task at that station. Accordingly, in order to form the fuel tank 111 shown in FIG. 1, a manufacturer must typically purchase and operate three different friction welding devices, each controlled by a corresponding different friction welding controller. While this approach has proven successful in that the single-purpose friction welding heads may be less susceptible to failure because they are tailored to a particular task, the foregoing approach is also expensive and can consume a large amount of factory space. Accordingly, embodiments of the present disclosure are directed to modular friction welding heads that can be moved from one station to another and can accordingly complete a variety of tasks, rather than just a single task.

Figure 3:
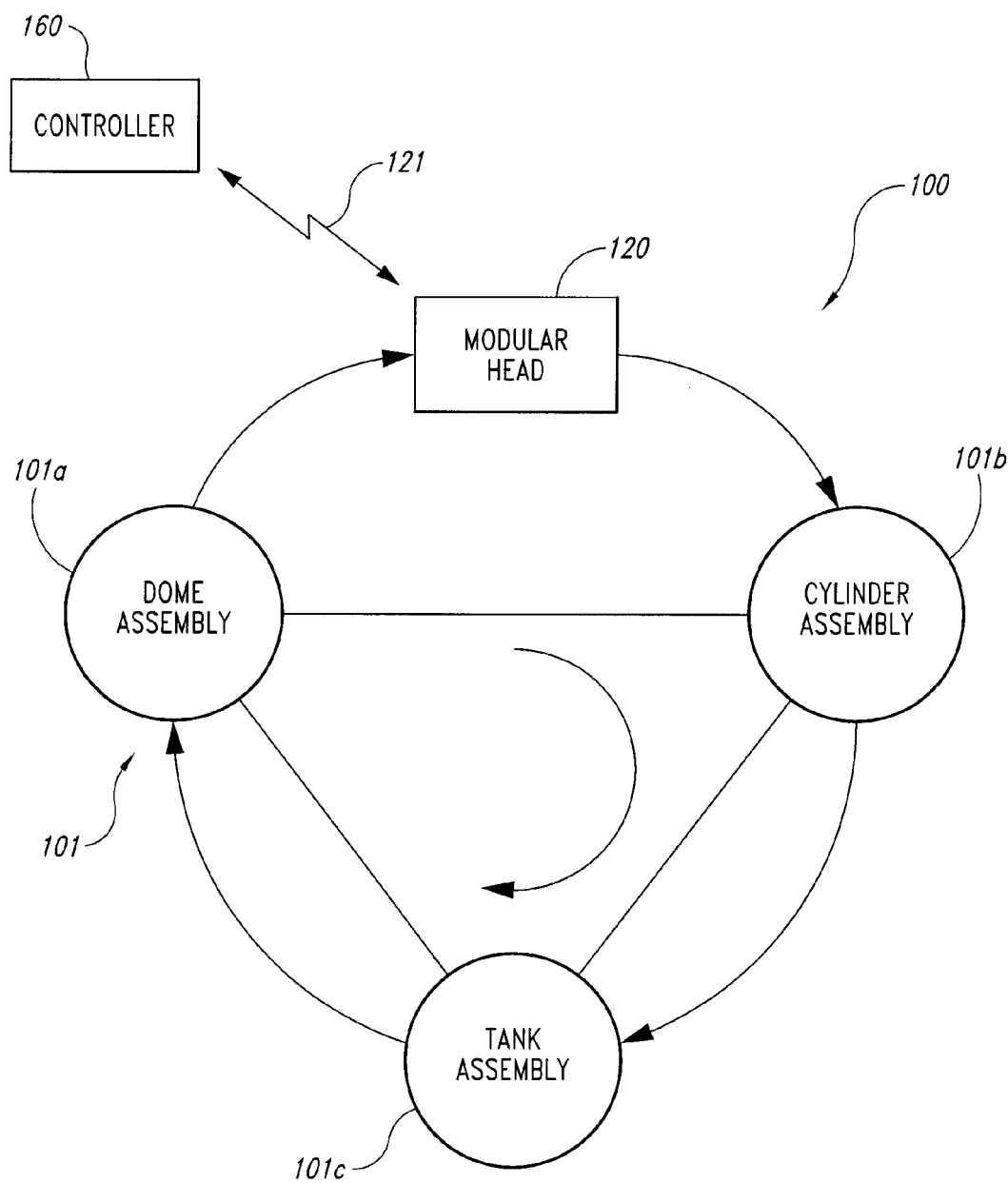
FIG. 3 is a schematic block diagram illustrating a process for welding components using a modular welding head in accordance with embodiments of the disclosure.

FIG. 3 is a flow diagram illustrating three stations 101 associated with manufacturing the fuel tank 111 shown in FIG. 1. These stations 101 can include a dome assembly station 101a, a cylinder assembly station 101b and a tank assembly station 101c. A system 100 in accordance with an embodiment of the disclosure includes a modular friction welding head 120 (e.g., a modular friction stir welding head) that may be moved among the three stations 101a, 101b, 101c, thus reducing or eliminating the need for multiple welding heads. In addition, the modular head 120 can be controlled by a single controller 160, thus reducing or eliminating the need for multiple controllers.

In a particular embodiment, the controller 160 is a computer-based controller that includes hardware and software for executing computer-based instructions. Accordingly, certain embodiments described below may take the form of computer-executable instructions, including routines executed by a programmable computer. Those skilled in the relevant art will appreciate that such embodiments can be practiced on computer systems other than those shown and described below. The controller 160 typically includes one or more processors, memories, and input/output devices, including keyboard(s) and/or display screens or monitors. The controller 160 can remain stationary while the modular head 120 moves from one station 101 to the other. In another embodiment, the controller 160 can be portable. In either embodiment, the controller 160 can be connected to the modular head 120 with a communication link 121, e.g., a flexible communication link. In a particular embodiment, the communication link 121 includes cables, so as to avoid electromagnetic interference that may be associated with a wireless link. However, in other embodiments, the controller 160 can control the modular head 120 with a wireless link, assuming it is suitably noise-free. In any of these embodiments, the controller 160 can control both the welding action and the motion of the modular head 120 at each station 101.

The modular head 120 includes elements typically used to create friction welds, e.g., a pin tool, a spindle that rotates the pin tool to create the friction necessary for welding, and one or two shoulders that control the flow of metal formed during the weld. Further details of a representative modular head 120 are described below with reference to FIGS. 7A-7B. The modular head 120 can be configured to operate with a support structure or tooling that provides support on the backside of the piece that is being welded, or the modular head 120 include a self-reacting device that eliminates the need for such a support. The modular head 120 can include hydraulics or other drivers/actuators that provide the forging force needed to produce the friction weld, or the force can be produced by another device. Suitable devices include an electrically operated device, for example, a linear voltage displacement transducer. The modular head 120 can optionally include a laser tracking device or another vision system, for example, one or more micro-cameras. The modular head 120 can still further include a pigtail or other receiving device to which the communication link 121 described above with reference to the controller 160 is attached. In a particular embodiment, the modular head 120 includes custom-made elements and/or assemblies available from any number of friction stir welding device manufacturers including ESAB of Stockholm, Sweden, Nova-Tech of Lynnwood, Wash., and MTS of Eden Prairie, Minn.

Figure 4A:
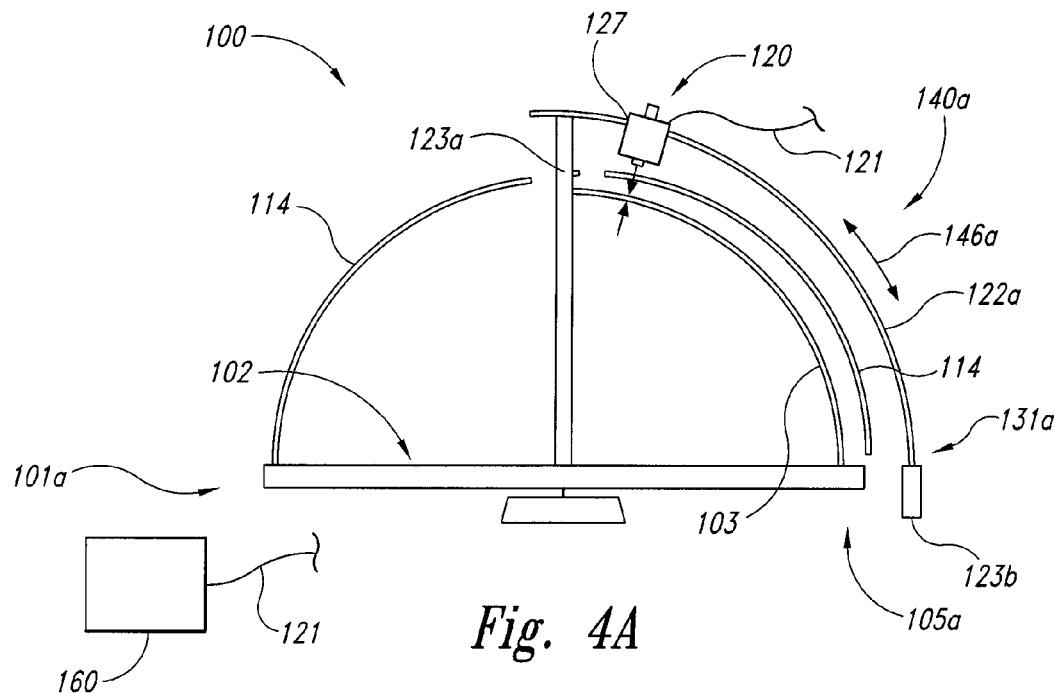
FIGS. 4A and 4B illustrate a technique for welding components of a fuel tank dome in accordance with an embodiment of the disclosure.
Figure 4B:
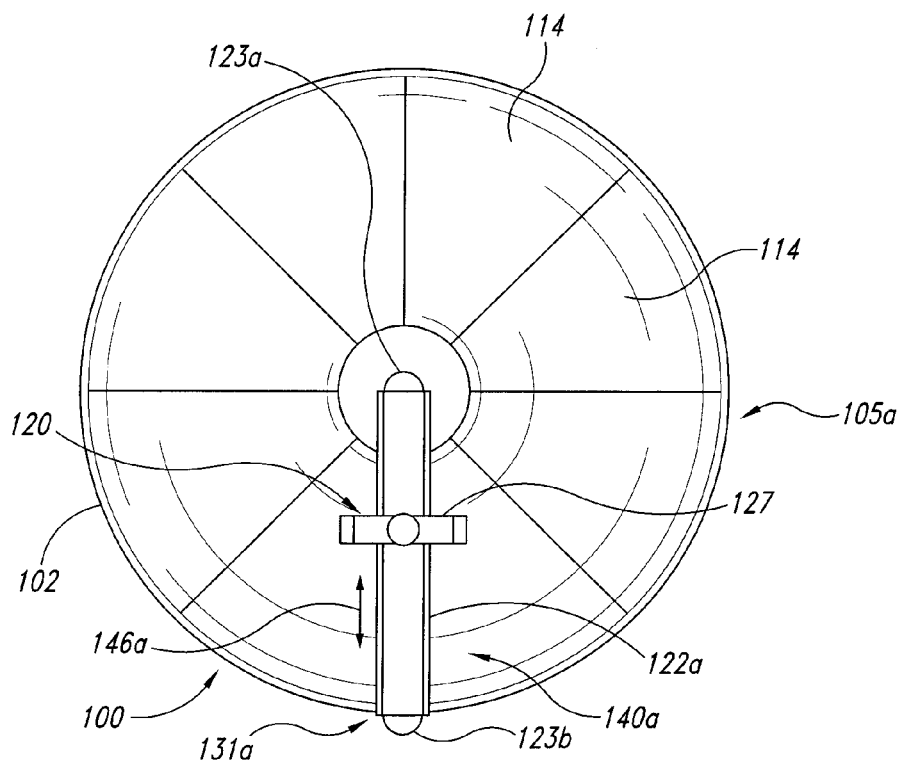

FIG. 4A is a partially schematic, side view illustration of a portion of the system 100 located at the dome assembly station 101a shown in FIG. 3. FIG. 4B is a top view looking down on the system 100 shown in FIG. 4A. In one aspect of an embodiment shown in FIGS. 4A and 4B, the system 100 includes a first carrier fixture 105a that supports multiple gores 114. For example, the first carrier fixture 105a can include a rotary table 102 carrying tooling 103 that in turn supports multiple gores 114. The rotary table 102 can include provisions (e.g., slots) for supporting gores 114 and associated tooling 103 having multiple diameters, thicknesses, or other dimensions. The tooling 103 can be retractable and/or can have other features, e.g., to support multiple functions performed at the dome assembly station 101a. Such functions can include trimming in addition to welding. The system 100 can further include a first guide structure 140a (e.g., a dome track 122a) that carries the modular head 120 for movement relative to the gores 114, and that is supported by a first head support 131a having one or more head support elements 123, e.g., a central support element 123a and an outer or peripheral support element 123b. The central support element 123a can telescope, e.g., to handle gores 114 of different diameters and/or to provide support for the polar flange 118 (FIG. 2B). In general, the first guide structure 140a is positioned close to the expected location of the gores 114 that are to be welded, so as to reduce the extent to which the modular head 120 is cantilevered relative to the dome track 122a. In operation, the modular head 120 includes a transporter 127 or other suitable device that moves along a first constrained motion path 146a as the modular head 120 welds neighboring gores 114. The first constrained motion path 146a is curved or arcuate in the embodiment shown in FIGS. 4A and 4B. The curvature of the first motion path 146a can be in a single plane (e.g., the plane of FIG. 4A), or a transverse plane, or both, depending upon the welding operation to be performed. In any of these embodiments, after an individual weld is completed, the rotary table 102 can rotate to align the next interface between neighboring gores 114 with the first motion path 146a of the modular head 120.

The first guide structure 140a can include any suitable arrangement for supporting the motion of the modular head 120. For example, the first guide structure 140a can include a rack and pinion arrangement attached to a sturdy supporting railing or other structure, as described further below with reference to FIGS. 7A-7B. The rack-and-pinion arrangement can include anti-backlash gearing to improve the accuracy with which the modular head 120 is positioned. In other embodiments, the first guide structure 140a can include a C-channel, an arrangement of rods, and/or another device. In any of these embodiments, the modular head 120 can include a drive motor or other drive device that moves the modular head 120 relative to the associated guide structure. In another embodiment, the drive device can be carried by the first guide structure 140a itself. For example, the first guide structure 140a can include a moving toothed belt, chain, or other "tow rope" type arrangement to which the modular head 120 is connected.

Figure 5A:
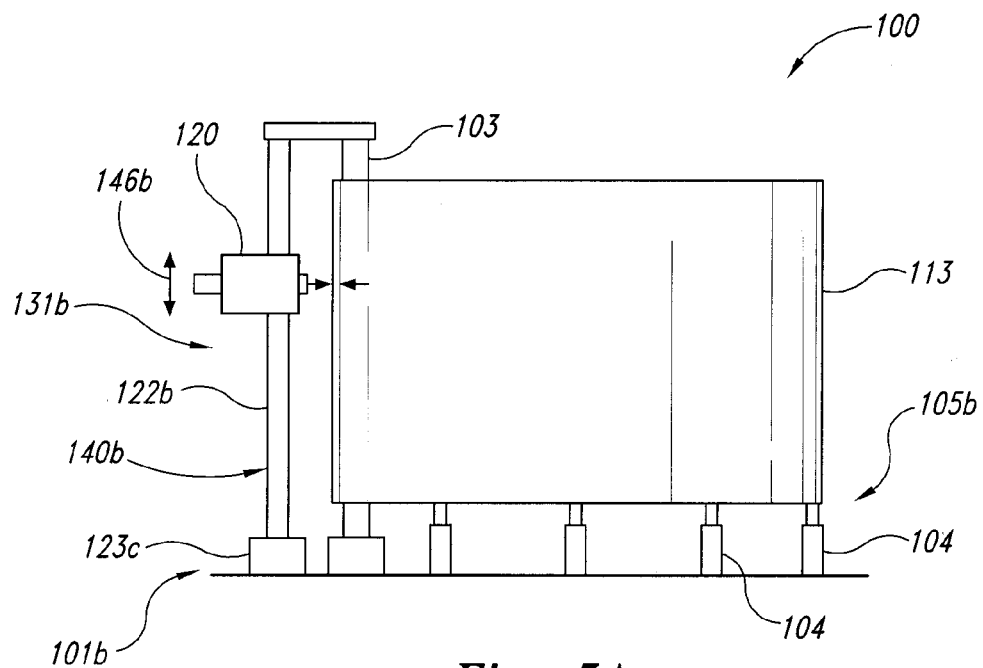
FIGS. 5A and 5B illustrate a technique for welding a cylindrical portion of a fuel tank in accordance with an embodiment of the disclosure.
Figure 5B:
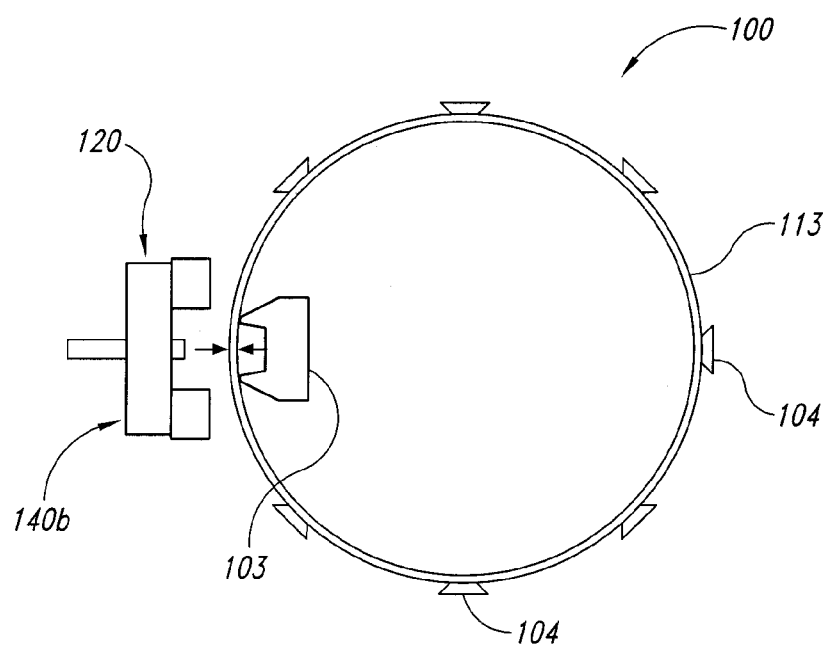

FIG. 5A is a partially schematic, side elevation view of a portion of the system 100 located at the cylinder assembly station 101b shown in FIG. 3. FIG. 5B is a top view of the system 100 shown in FIG. 5A. Referring to FIGS. 5A and 5B, the system 100 can include a second head support 131b that in turn includes a second guide structure 140b (e.g., a cylinder track 122b) that extends upwardly from a base support element 123c adjacent to an outer surface of the cylinder 113. The cylinder track 122b carries the modular head 120, e.g., the same modular head 120 as is used at the dome assembly station 101a (FIG. 4A). Accordingly, the modular head 120 can be detached from the first guide structure 140a (FIGS. 4A and 4B) and removably attached to the second guide structure 140b. The second guide structure 140b defines a second constrained motion path 146b which is a straight line in the embodiment shown in FIGS. 5A-5B. Accordingly, the modular head 120 can operate along both a straight line motion path and a curved motion path. In a particular aspect of this embodiment, cylinder assembly station 101b includes a second carrier fixture 105b that in turn includes assembly tooling 103 positioned at the inner surface of the cylinder 113 to react forces provided by the modular head 120. Optionally, the assembly tooling 103 can be connected to the second guide structure 140b above the cylinder 113 for enhanced support. The second guide structure 140b can have any of the arrangements described above with reference to the first guide structure 140a, and can be positioned close to the cylinder 113 to reduce bending moments. The modular head 120 can perform trimming operations, in addition to welding operations.

If the cylinder 113 includes multiple sections and requires multiple welds, it can be indexed either manually or via a turntable generally similar to that described above with reference to FIGS. 4A and 4B. In another embodiment, the second carrier fixture 105b can include cylinder supports 104 for the cylinder 113. The supports 104 can include fixed stanchions with rollers at the interface with the cylinder 113. In yet another embodiment, the second carrier fixture 105b can include a ring-shaped track that allows the cylinder 113 to rotate relative to the modular head 120. In still another embodiment, the base support element 123c can include a circular track that allows the upwardly projecting cylinder track 122b and the modular head 120 to orbit around the cylinder 113 prior to performing welding or trimming operations at multiple circumferential locations around the cylinder 113.

Figure 6:
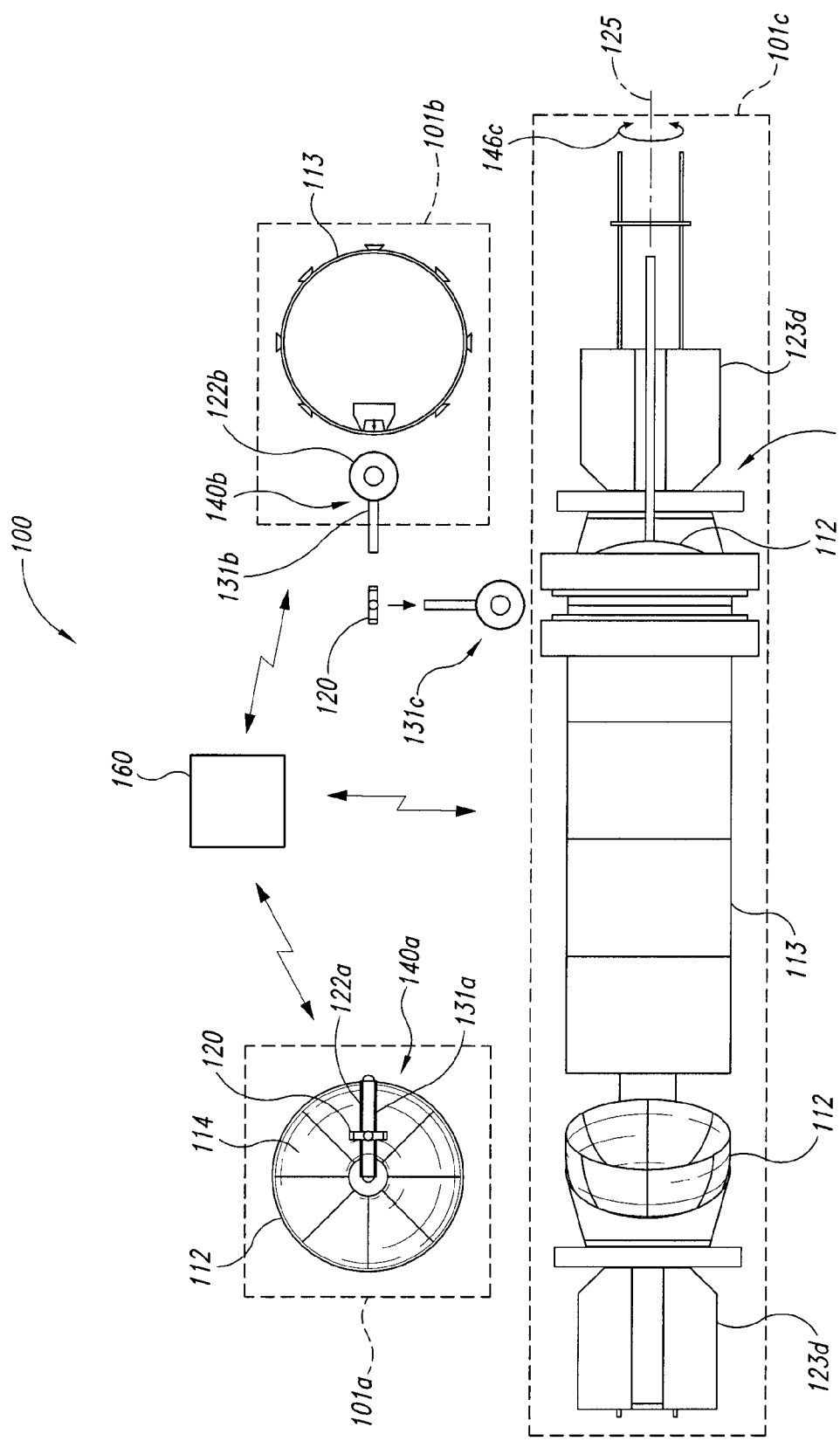
FIG. 6 is an illustration of a process for joining a fuel tank cylinder and a fuel tank dome using techniques in accordance with an embodiment of the disclosure.

FIG. 6 is a partially schematic, top plan view of the system 100 illustrating all three stations 101a, 101b and 101c. As shown in FIG. 6, the modular head 120 can be moved from the first guide structure 140a (e.g., the dome track 122a) at the dome assembly station 101a to the second guide structure 140b (e.g., the cylinder track 122b) at the cylinder assembly station 101b. The modular head 120 can then be moved from the cylinder track 122b to a third head support 131c at the tank assembly station 101c. The third head support 131c can be firmly anchored in place. Accordingly, the modular head 120 can have a fixed position relative to the cylinder 113 and the domes 112 at the tank assembly station 101c. The domes 112 and the cylinder 113 can be carried by a third carrier fixture 105c having one or more rotary supports 123d that rotate these components about a longitudinal axis 125 while the modular head 120 forms the dome/cylinder welds 117 (FIG. 1) at the junctions between the domes 112 and the cylinder 113. The motion of the domes 112 and the cylinder 113 can accordingly be along a third (curved) constrained motion path 146c. The third carrier fixture 105c can translate along the longitudinal axis 125 to sequentially align each dome 112 with the third head support 131c, or the third head support 131c can translate to provide the same alignment. This arrangement can also be used to weld multiple axially-positioned sections of the cylinder 113 together to produce a cylinder that is elongated along the longitudinal axis 125.

Figure 7A:
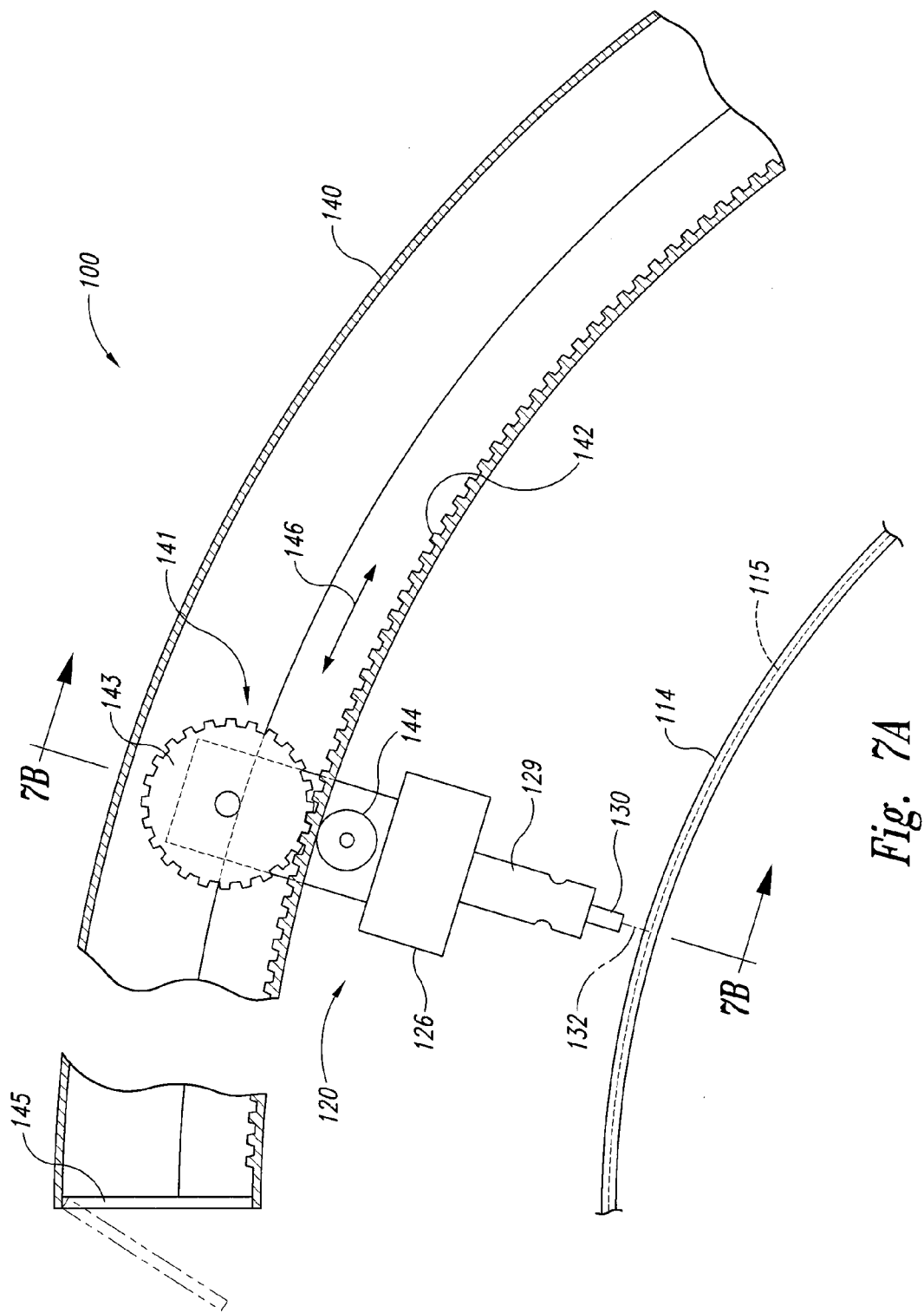
FIG. 7A is a partially schematic side view of a friction welding head and guide structure configured in accordance with an embodiment of the disclosure.

FIG. 7A is a partially schematic, cross-sectional illustration of a guide structure 140 and modular friction welding head 120 configured in accordance with an embodiment of the disclosure. In one aspect of this embodiment, the guide structure 140 describes a curved motion path 146 that is generally parallel to the curved outer surface of the gore 114 upon which the modular head 120 operates. Accordingly, the guide structure 140 can be used at the first station 101a described above. The system 100 can further include engagement features 141, which, in a particular embodiment, include one or more racks 142 carried by the guide structure 140, and one or more corresponding pinions 143 carried by the modular head 120. The engagement features 141 are generally common to multiple guide structures to support the modular, portable aspects of the modular head 120. As discussed above, the pinions 143 can include anti-backlash pinions that increase the repeatability with which the modular head 120 can be located at any point along the motion path 146. The modular head 120 can further include one or more retainer wheels 144 or other devices that engage the outside of the guide structure 140 to help keep the pinions 143 engaged with the racks 142. The modular head 120 can further include a housing 126 that in turn carries a spindle 129 and a friction stir welding probe 130. The spindle 129 and probe 130 rotate about a spindle axis 132 to provide a friction stir weld at the gore 114, in a manner generally known to those of ordinary skill in the relevant art. The motion path 146 can be curved about one or more axes, e.g., one or more axes that are transverse to the spindle axis.

As the modular head 120 travels along the motion path 146 to produce the gore weld 115, it can be prevented from inadvertently traveling off the guide structure 140 by a releasable stop 145. In a particular embodiment, the releasable stop 145 can be disengaged (e.g., by pivoting the stop 145 as shown in dashed lines in FIG. 7A) to allow the modular head 120 to be removed from the guide structure 140 and placed on another guide structure. The modular head 120 can typically weigh thousands of pounds, and is accordingly handled by an overhead crane, lift, or other heavy-duty machinery in a typical embodiment. This arrangement can be adjusted to be more robust or less robust, depending upon the size of the modular head 120.

Figure 7B:
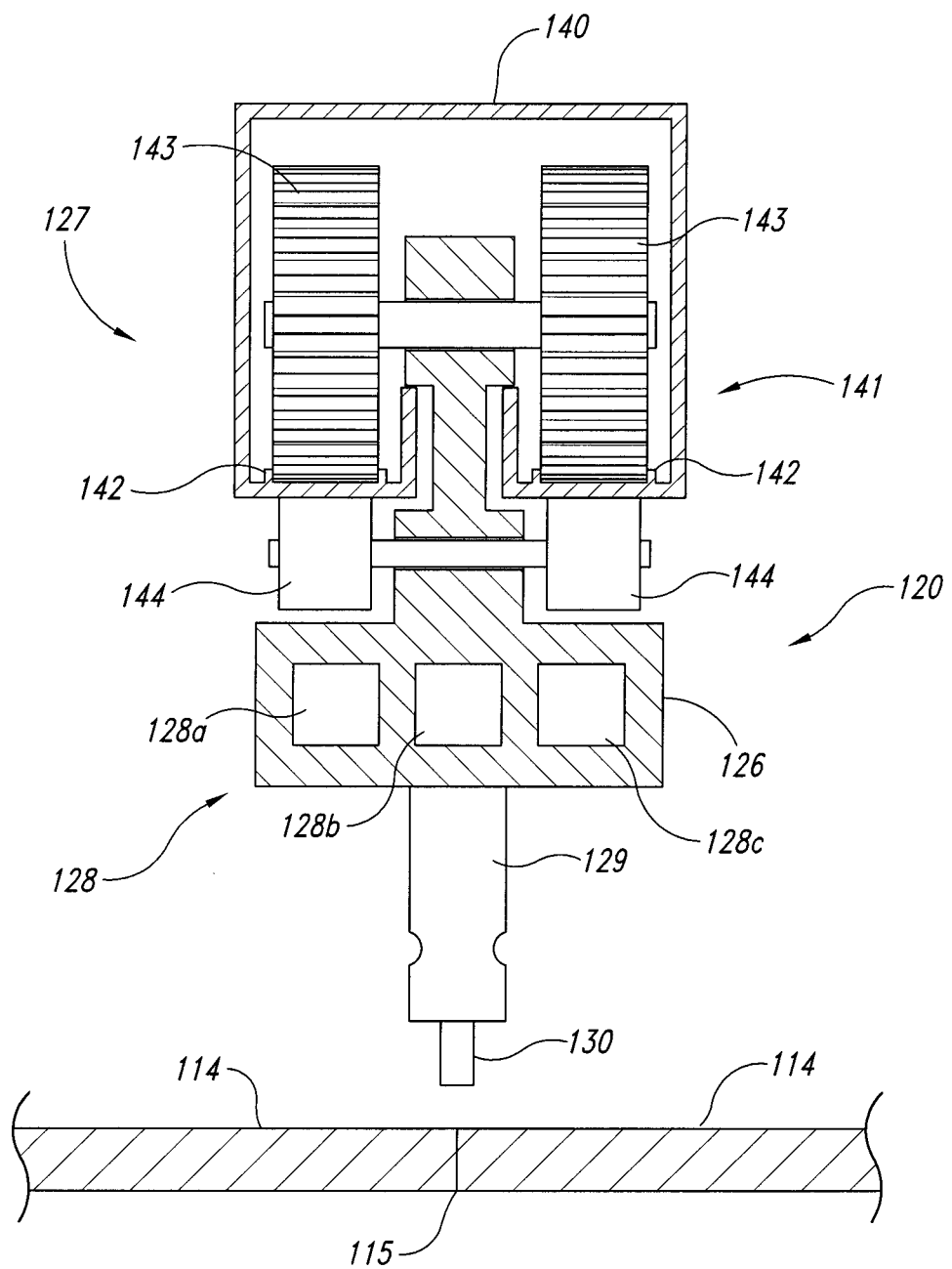
FIG. 7B is a partially schematic cross-sectional end view of an embodiment of the friction welding head and guide structure, taken generally along line 7B-7B of FIG. 7A.

FIG. 7B is a partially schematic, cross-sectional illustration of the guide structure 140 and modular head 120 shown in FIG. 7A. As shown in FIG. 7B, the engagement features 141 can include two racks 142, and two corresponding pinions 143. The pinions 143 can form a portion of a transporter 127 that is in turn connected to the rest of the head 120. The housing 126 of the head 120 can carry multiple actuators 128, including a travel actuator 128a (which rotatably drives the pinions 143), a force actuator 128b (which provides a normal force to the spindle 129), and a rotation actuator 128c (which rotates the spindle 129 about the spindle axis 132). The actuators 128 can include any suitable devices, including hydraulically powered devices, electrically powered devices, or pneumatically powered devices.

One aspect of embodiments of the system 100 described above with reference to FIGS. 1-7B is that they can include a single modular head 120 and a single controller 160, with each configured to perform different friction welding operations at different stations. One expected advantage of this arrangement is that it can reduce the cost of producing friction welds by reducing the number of welding heads and/or controllers required to form selected structures. For example, in one embodiment, a manufacturer need purchase and operate only a single controller 160 and a single modular head 120 to produce a fuel tank that normally requires three separate welding heads and three associated controllers.

In other embodiments, the system 100 can include multiple modular heads 120 and multiple controllers 160. Even in these embodiments, the cost of the overall system 100 may be less than the cost of conventional systems. For example, the modular heads 120, even if they number more than one, may be interchangeable with each other and may accordingly be manufactured as an off-the-shelf item rather than a custom item. Similarly, even if the system 100 includes multiple controllers 160, the controllers 160 may be interchangeable, thus reducing the cost of the controllers when compared with the cost of a custom manufactured controller.

Figure 8:
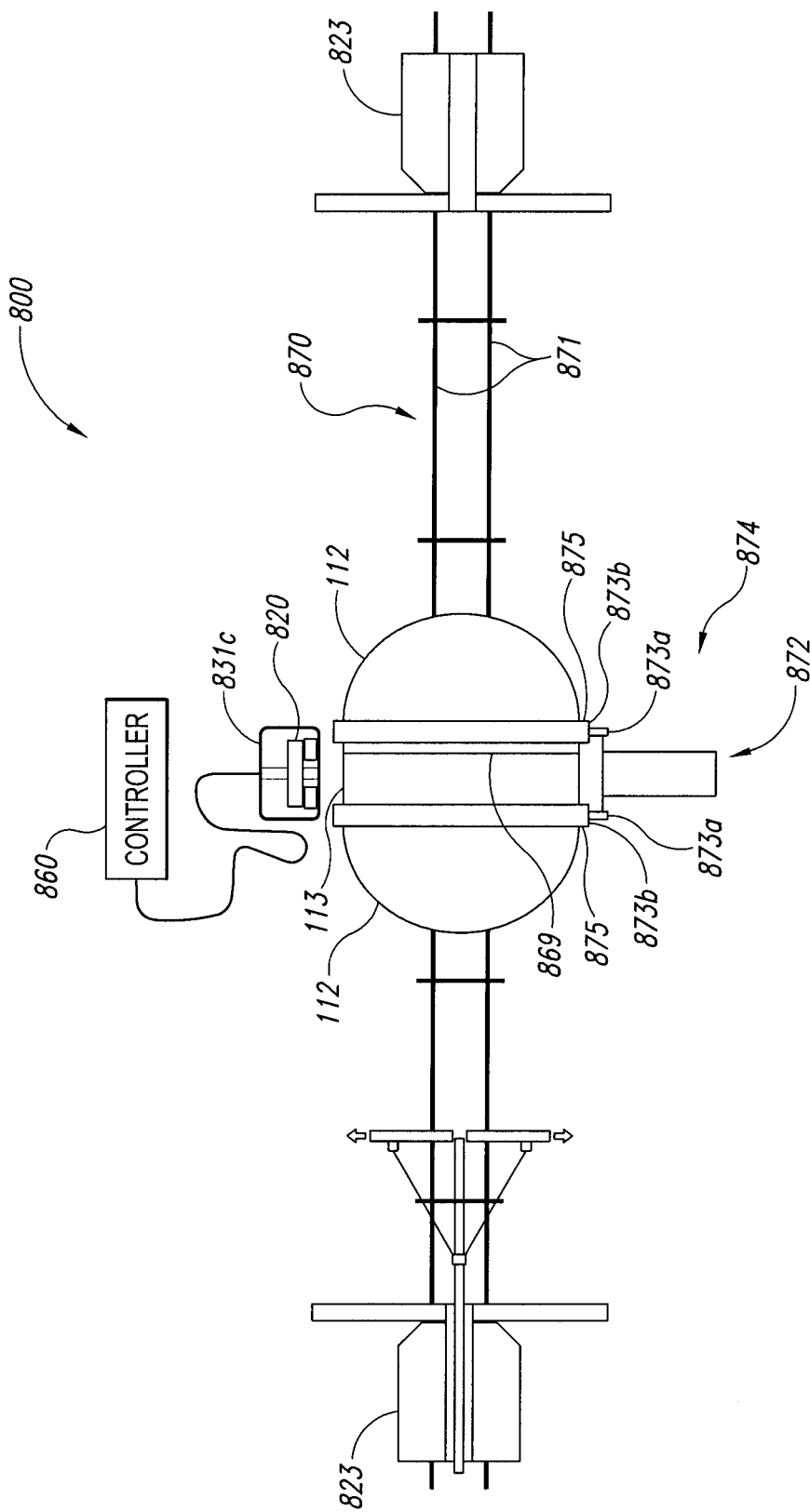
FIG. 8 is a partially schematic, top plan view of a friction stir welding system configured in accordance with another embodiment of the disclosed technology.

FIG. 8 is a partially schematic, top plan view of a system 800 that includes one or more support assemblies that support components or workpieces during a friction welding operation and/or a trim operation. In particular embodiments, the support assemblies rotate, and in other embodiments, the support assemblies can undergo other types of motion. The illustrated portion of the system 800 can accordingly perform functions generally similar to those described above with reference to the tank assembly station 101c shown in FIG. 6. The system 800 can include a third support 831c carrying a modular head 820 for performing trimming and/or welding operations under the direction of a controller 860. The system 800 can further include one or more translating supports 823 that move along a motion path 870 to deliver components to the third support 831c for welding and/or trimming operations. In a particular embodiment, the motion path 870 includes rails 871 that guide the motion of the translating supports 823. In other embodiments, the motion path 870 can include other suitable elements (e.g., one or more grooves). In any of these embodiments, the translating supports 823 can deliver the workpieces to a corresponding rotating support assembly 874, which can include one or more (e.g., two) drive rings 875. The drive rings 875 grip or otherwise engage the workpieces (e.g., the outer circumferences of the workpieces) as the workpieces are rotated. In an embodiment shown in FIG. 8, the translating supports 823 are retracted once the drive rings 875 are engaged with the corresponding workpieces. In other embodiments, the translating supports 823 (or portions thereof) can remain attached to the workpieces to provide additional support, and can accordingly rotate with the workpieces. In any of these embodiments, the drive rings 875 can be rotated by a motor assembly 872. Accordingly, the motor assembly 872 includes first drive elements 873a that mate with or otherwise engage with second drive elements 873b carried by the drive rings 875.

In an aspect of an embodiment shown in FIG. 8, the left hand drive ring 875 supports a dome 112 and a cylinder 113 that were joined in a previous operation by the system 800. The right hand drive ring 875 supports a corresponding dome 112 which is axially pressed against the right end of the cylinder 113. The resulting interface 869 is then joined by the modular head 820. During the joining operation, the motor assembly 872 rotates both drive rings 875 in the same direction in a synchronous manner while the modular head 820 performs a welding operation (e.g., a friction stir welding operation). In a typical trimming operation, the motor assembly 872 may be engaged with only a single drive ring 875 which supports a workpiece such that one end of the workpiece is exposed and accessible for trimming. Further details of the rotating support assembly 874 and the motor assembly 872 are described below with reference to FIGS. 9-12.

Figure 9:
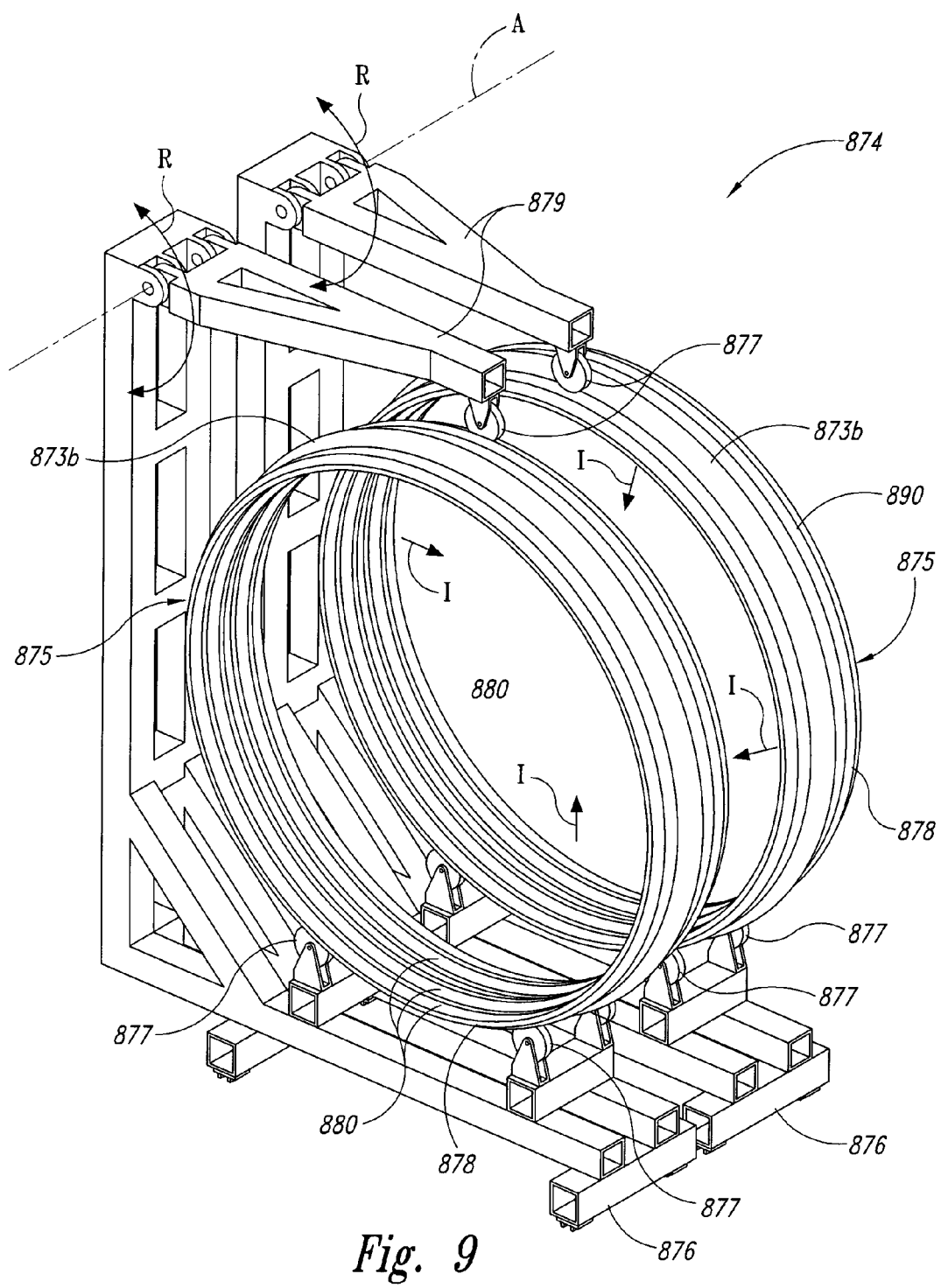
FIG. 9 is a partially schematic, side isometric view of two rotating supports for carrying friction stir welding workpieces in accordance with an embodiment of the disclosed technology.

FIG. 9 is a partially schematic, isometric illustration of a representative rotating support assembly 874. The rotating support assembly 874 in this particular embodiment includes two drive rings 875, each carried by a corresponding drive ring carriage 876. Each of the drive rings 875 can carry a cylinder 113 (FIG. 8), a dome 112 (FIG. 8) or another component, depending upon which type of workpiece is being operated on at a particular point in the manufacturing sequence. In most instances, the workpiece supported by the drive ring 875 is radially symmetric though in particular embodiments, the workpiece can have a shape that is not radially symmetric.

Each drive ring 875 can include a generally cylindrical body 890 carrying one or more inflatable members 880 that extend around some or all of the circumference of the region enclosed by the drive ring 875. Each of the inflatable members 880 can be inflated with a suitable fluid (e.g., a gas or liquid) so as to expand radially inwardly (as indicated by arrows I) to engage the outer circumference, periphery or other outwardly-facing surface of the workpiece. In a particular embodiment, the inflatable members 880 are inflated with readily available shop air at a pressure of about 50 psi or less. In other embodiments, the inflatable members 880 can be inflated with other gases or liquids. In any of these embodiments, the inflatable members 880 can provide a uniform or generally uniform force around the circumference of the workpiece, and can be easily and repeatedly inflated and deflated to support the workpiece during operations, and release the workpiece after the operations have been completed. During a typical operation, the workpiece is inserted into the drive ring opening (or the drive ring 875 is slipped over the workpiece) and the inflatable members 880 are inflated. The inflatable members 880 can remain inflated until the drive rings 875 are removed. In the illustrated embodiment, each drive ring 875 includes three inflatable members 880 axially spaced apart along a common axis. In other embodiments, the drive ring 875 can include more or fewer inflatable members depending on factors that can include the size and weight of the workpiece and the elastic characteristics of the inflatable members 880. The drive ring 875 can include a single inflatable member 880 at each axial position, or multiple inflatable members 880 at one or more locations (e.g., with individual inflatable members 880 positioned at different circumferential locations around the drive ring 875).

In addition to the inflatable members 880, each drive ring 875 can include one or more roller tracks 878 or other elements that facilitate supporting and aligning the drive ring 875 as it rotates. In a particular embodiment, each drive ring 875 includes two roller tracks 878, each of which receives one or more rollers 877 carried by the drive frame carriage 876. In a particular embodiment shown in FIG. 9, the drive ring carriage 876 includes multiple rollers 877 that rotate about fixed axes at positions toward the bottom of the drive ring carriage 876, to support the weight of the drive ring 875 and the workpiece with which it is engaged. The drive ring carriage 876 can also include one or more rollers 877 carried by corresponding arms 879 that provide additional guidance for the drive rings 875, e.g., toward the tops of the drive rings 875. The arms 879 can be pivotable relative to the rest of the drive ring carriage 876 about a pivot axis A, so as to rotate toward and away from the drive rings 875 as indicated by arrows R. Accordingly, the arms 879 can be rotated out of the way to allow the completed workpiece assembly (e.g., welded cylinders and domes) to be lifted out of the drive ring carriage 876. Once the welded components are lifted from the drive ring carriage 876, with the drive rings 875 attached, the drive rings 875 can be detached by deflating the inflatable members 880, sliding the drive rings axially away from the workpiece, and replacing the drive rings 875 at the corresponding drive ring carriages 876. In another embodiment, the inflatable members 880 can be deflated and the drive rings 875 and/or the assembled workpiece can be removed (e.g., by axial sliding) from the drive rings 875 and from the overall assembly, while the drive rings 875 remain at the drive ring carriages 876.

Figure 10:
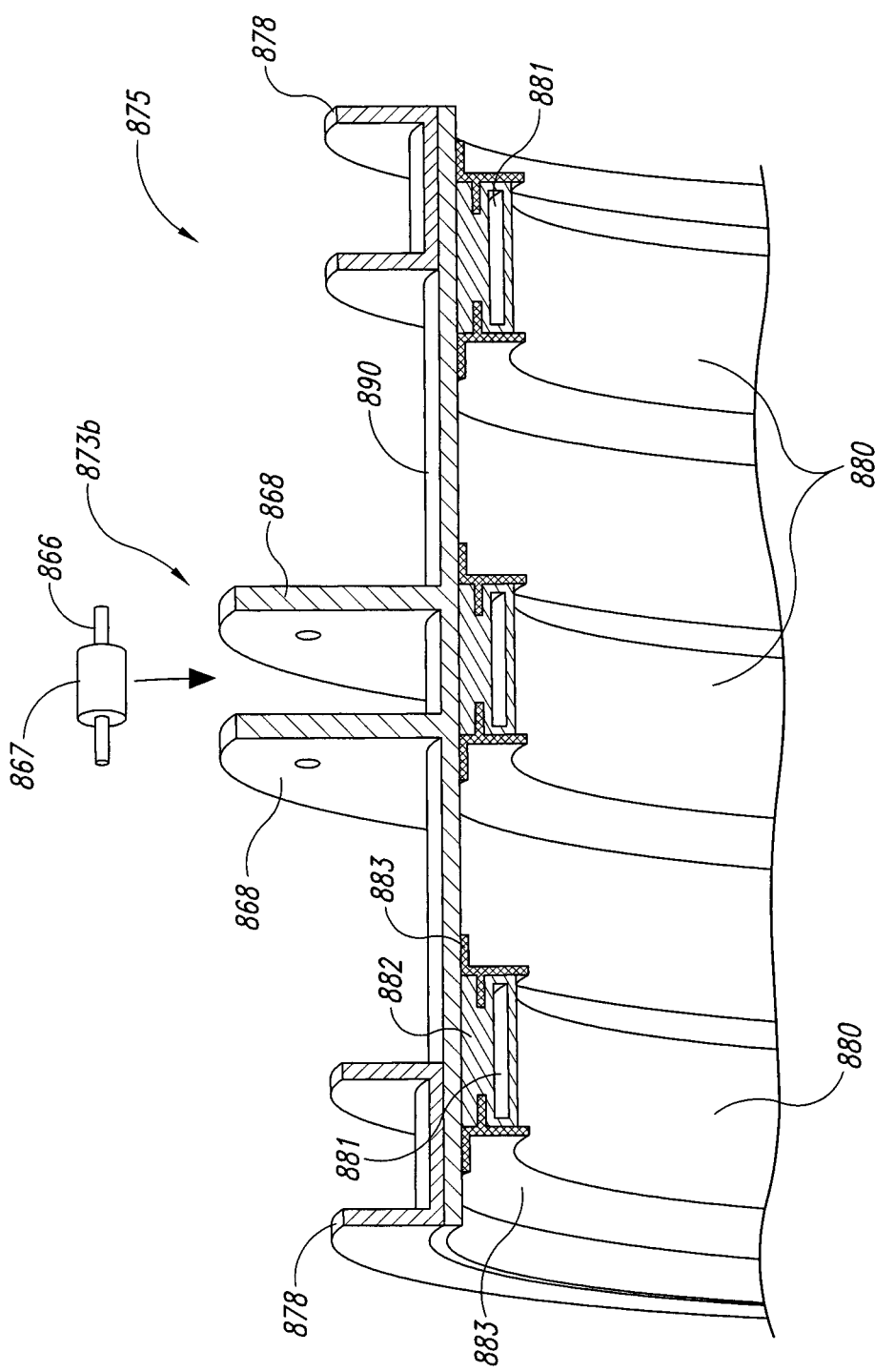
FIG. 10 is a partially schematic cross-sectional side view of a portion of a drive ring that forms part of the rotating support shown in FIG. 9, in accordance with an embodiment of the disclosed technology.

FIG. 10 is an enlarged, cut-away illustration of a portion of a representative drive ring 875 shown in FIG. 9. The drive ring 875 includes a generally cylindrical body 890 that carries outwardly positioned roller tracks 878, and inwardly positioned inflatable members 880. The roller tracks 878 engage with corresponding rollers, as described above with reference to FIG. 9. The inflatable members 880 shown in FIG. 10 have a generally rectangular or elliptical shape, with a corresponding rectangular or elliptically-shaped interior volume 881. Pressurized fluid is supplied to the interior volume 881, causing the inflatable member 880 to bulge radially inwardly, as indicated by arrows I in FIG. 9. Individual inflatable members 880 can also include a retention portion 882 that facilitates securing the inflatable member 880 to the cylindrical body 890. In a particular embodiment, the retention portion 882 has a "T" shaped cross-section that is received by corresponding retainer elements 883, which are in turn secured to the inner surface of the cylindrical body 890. The retention portion 882 can be formed integrally with the rest of the inflatable member 880 to reduce or eliminate the likelihood that the inflatable member 880 will separate from the retention portion 882 after repeated inflation/deflation cycles. In a particular embodiment, the inflatable member 880 can be formed from rubber or another suitable elastomeric material, and the retainer elements 883 can be formed from a suitable metal (e.g., aluminum) or high-strength plastic. The retainer elements 883 can be removably secured to the cylindrical body 890, thus allowing the inflatable members 880 to be accessed for service or to be replaced.

The cylindrical body 890 also supports the second drive element 873b, which is shown schematically in FIG. 9 and which extends radially outwardly from the cylindrical body 890. The second drive element 873b engages with the motor assembly 872, shown schematically in FIG. 8. In a particular embodiment, the second drive element 873b includes two spaced-apart flanges 868 that carry multiple roller bearings 867, one of which is shown in an exploded view in FIG. 10. The flanges 868 can be formed integrally with or attached to the cylindrical body 890. Each roller bearing 867 includes a pin 866 having opposing ends that are received in the corresponding flanges 868. The roller bearings 867 engage with gear teeth carried by or otherwise operably coupled to the motor assembly 872, as described in further detail below with reference to FIGS. 11 and 12.

Figure 11:
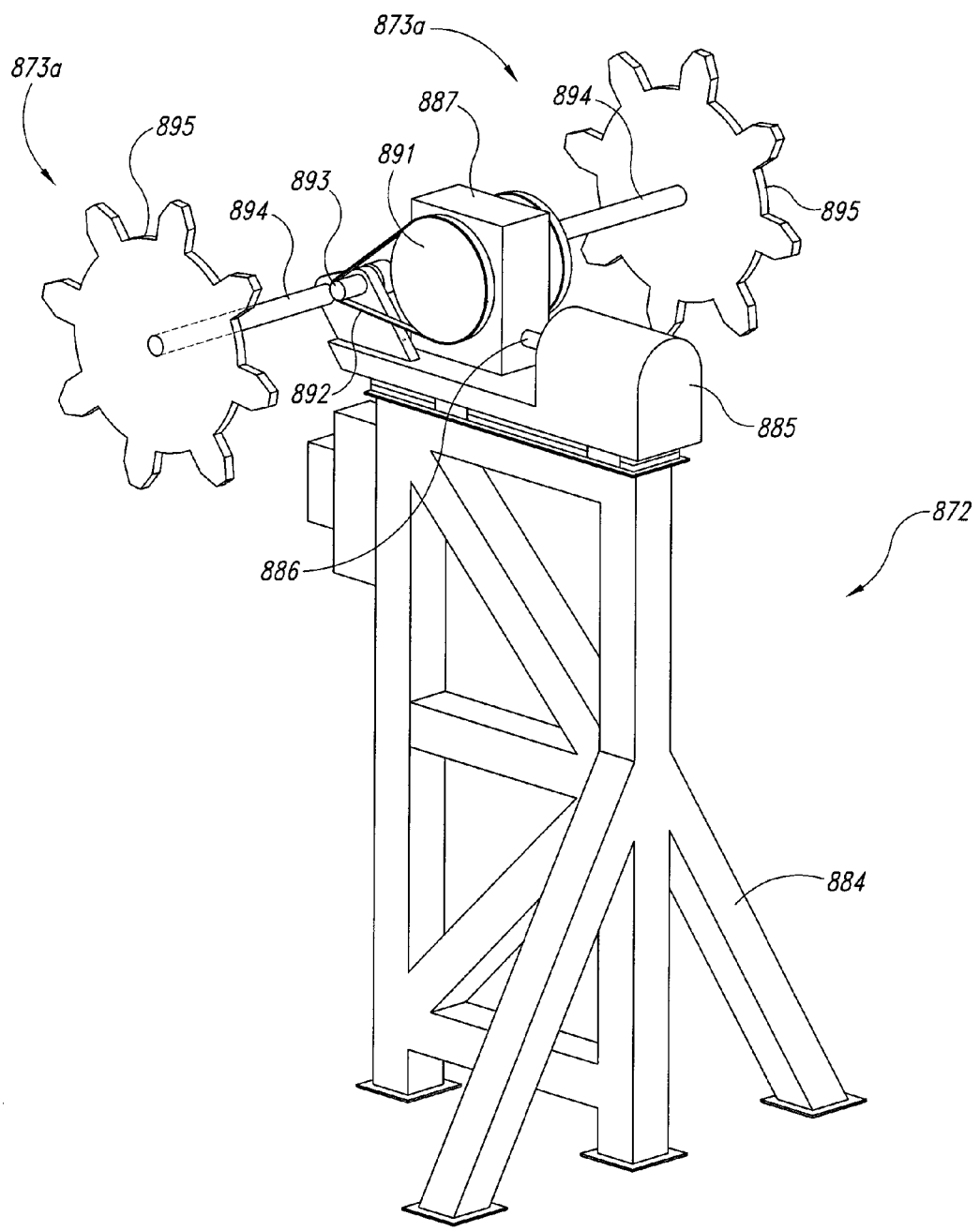
FIG. 11 is a partially schematic, isometric illustration of a motor assembly for rotating the drive rings shown in FIG. 9, in accordance with an embodiment of the disclosed technology.

FIG. 11 is a partially schematic, isometric illustration of a representative motor assembly 872 configured in accordance with an embodiment of the disclosed technology. The motor assembly 872 can include a support 884 carrying a motor 885, e.g., an electrically driven motor. The motor 885 rotates a motor shaft 886, which can be received in a gear box 887. The gear box 887 can apply the power provided by the motor shaft 886 to two first drive elements 873a. In an illustrated embodiment, each first drive element 873a includes a drive wheel 891 configured to rotate a corresponding one of the drive rings 875 shown in FIG. 9. Accordingly, each drive wheel 891 can be coupled to a corresponding output shaft 893 via a belt 892 or other transmission element. Each output shaft 893 can be coupled to a drive shaft 894, which carries a gear 895. The gear 895 meshes with the roller bearings 867 described above with reference to FIG. 10. In this manner, the motor assembly 872 can drive both drive rings 875 at the same rate during a welding operation. During a typical trim operation, only one of the first drive elements 873a is engaged with a corresponding second drive element 873b, as discussed above.

Figure 12:
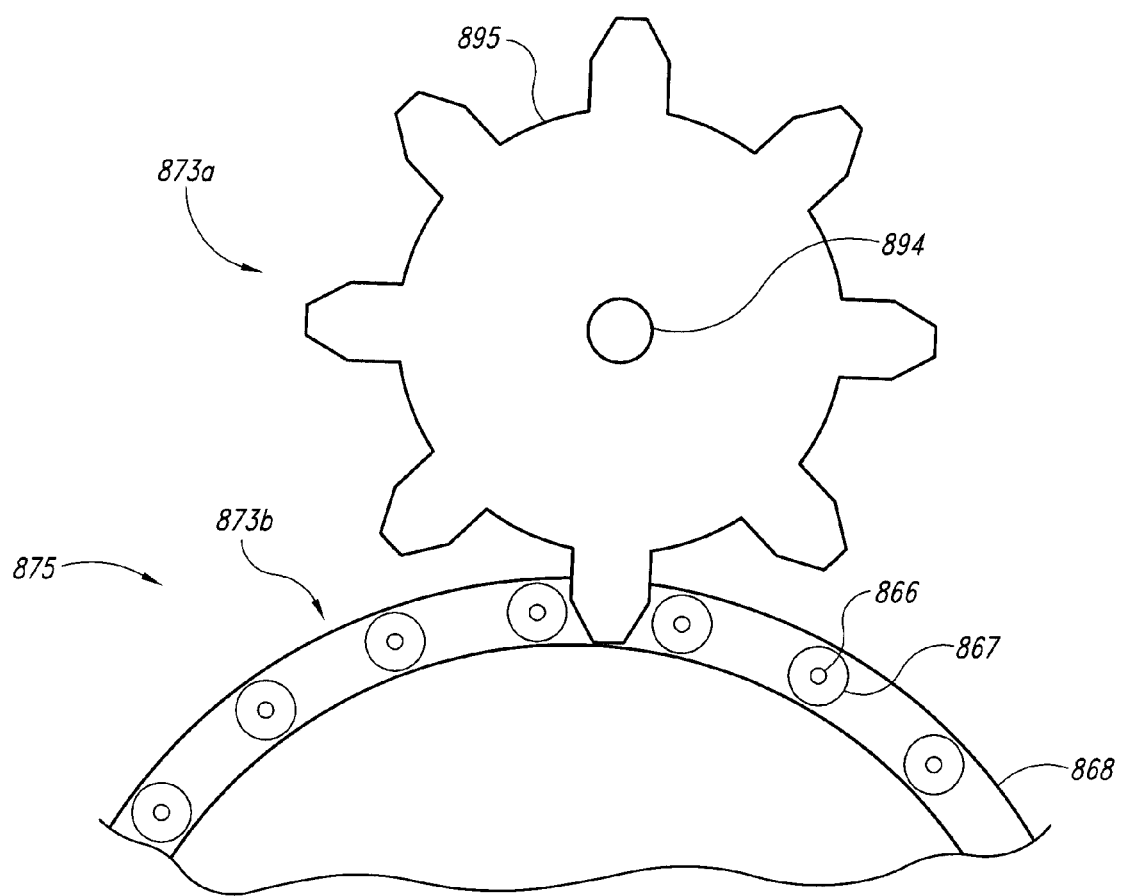
FIG. 12 is a partially schematic end view of an interface between a motor assembly and a drive ring in accordance with an embodiment of the disclosed technology

FIG. 12 is a partially schematic end view of a representative first drive element 873a (carried by the motor assembly 872 shown in FIG. 11) engaged with a representative second drive element 873b (carried by the drive ring 875 shown in FIG. 10). As shown in FIG. 12, the teeth of the gear 895 sequentially mesh with the roller bearings 867 as the drive shaft 894 rotates, providing a low-friction drive for the drive ring 875. In other embodiments, the first and second drive elements 873a, 873b can have other arrangements, e.g., a rack and pinion arrangement.

One feature of several of the embodiments described above is that they can include a rotating support assembly having an inflatable member that releasably supports a workpiece during trimming and/or welding operations. This is unlike existing workpiece supports, which typically include multiple actuators and corresponding pads positioned around the outer periphery of the workpiece. The foregoing features of the presently disclosed technology can provide several advantages compared with the conventional technology. For example, the presently disclosed technology can have a significantly reduced part count when compared with the conventional technology. In particular, the inflatable members 880 can have fewer parts and/or simpler parts than the multiple (e.g., 20 or more) actuators used in some conventional arrangements. Another feature of at least some of the foregoing embodiments is that the inflatable members 880 can provide a more uniform loading around the circumference of the workpiece. In particular, the pressure is provided uniformly to the entire inflatable member 880. Even though the force of gravity on the workpiece will result in higher forces toward the bottom of the workpiece than toward the top, the force distribution provided by the inflatable member is expected to be more uniform and significantly simpler to control than the force provided by multiple actuators positioned around the periphery of the workpiece. This arrangement can accordingly reduce the likelihood for applying too high a force to any portion of the workpiece, causing the workpiece to go "out of round" or otherwise become misshapen. Still a further feature of at least some of the foregoing embodiments is that the inflatable members can properly align the workpieces they carry, in addition to supporting the workpieces in position. Any of the foregoing features, alone or in combination, can advantageously reduce the cost of making and/or using the system, and can accordingly reduce the cost of making fuel tanks and/or other structures with the system.

From the foregoing, it will be appreciated that specific embodiments of the disclosure have been described herein for purposes of illustration, but that various modifications may be made without deviating from the disclosed technology. For example, while the foregoing embodiments were described generally in the context of manufacturing a fuel tank, the foregoing techniques and systems may be used to form structures other than fuel tanks. Particular structures and methods were described in the context of friction stir welding, but may also be applicable to other joining or welding techniques, including for example, friction plug welding, and/or other non-joining techniques (e.g., trimming techniques) with or without modular heads. Modular heads can be interchangeable and/or movable among three stations, as shown in FIG. 3, or other numbers of stations (greater or less than three) in other embodiments. In some embodiments, the inflatable members can be made from a thick rubber, such as is typically used for large overhead door seals, and in other embodiments, can be made from other suitable elastomeric materials. The inflatable members can bear on the outside of the workpiece in particular embodiments described above, and can bear on the inside of a workpiece, or on other workpiece surfaces, in other embodiments. The drive rings can be guided by rollers and roller tracks in certain embodiments described above, and in other embodiments, can be supported and/or guided with other arrangements. The drive rings can be in the form of complete rings in at least some embodiments, or partial rings in other embodiments (e.g., to support operations that do not require the workpiece to rotate 360°). The motor assembly can include first elements different than those described above (e.g., a worm) and can engage with correspondingly different second drive elements (e.g., a worm gear). When the workpiece is particularly long, it can be supported by additional rollers (with or without corresponding drive rings) to reduce cantilever loads. The method described in connection with FIG. 8 in the context of joining a dome to a cylinder can be applied to join a dome to a dome, a cylinder to a cylinder, and/or to join other workpieces. In at least some representative embodiments, the workpieces are radially symmetric, or at least partially radially symmetric. In other embodiments, the workpieces may not be symmetric. In at least some embodiments, the unitary inflatable members encircling the entire circumference of the workpiece can be replaced with multiple inflatable members positioned around the periphery of the workpiece, with each inflatable member controlled individually or ganged together.

Certain aspects of the embodiments described above may be combined or eliminated in other embodiments. For example, in many of the embodiments described above, the product upon which the modular head operates is supported by assembly tooling. In other embodiments, the assembly tooling may be reduced or eliminated, for example, if the modular head carries its own backing support for the product. Further, while advantages associated with certain embodiments have been described in the context of those embodiments, other embodiments may also exhibit such advantages, and not all embodiments need necessarily exhibit such advantages to fall in the scope of the present disclosure. Accordingly, the disclosure can include other embodiments not expressly shown or described above.

I claim:

1. A support assembly for processing workpieces, comprising:
   a carriage;
   a generally ring-shaped support member rotatable relative to the carriage, the support member including:
   a body; and
   at least one inflatable member carried by the body and positioned to expand from a first configuration to a second configuration for engaging a workpiece; and
   a roller and a roller track positioned to facilitate rotation of the support member relative to the carriage.

2. The assembly of claim 1 wherein the inflatable member expands in a radially inward direction from the first configuration to the second configuration.

3. The assembly of claim 1 wherein the roller is rotatably mounted at a fixed location relative to the carriage, and wherein the roller track is carried by the support member.

4. The assembly of claim 1 wherein the inflatable member is one of multiple inflatable members positioned along a common axis.

5. The assembly of claim 1 wherein the inflatable member is one of multiple inflatable members positioned at different circumferential locations around a common axis.

6. The assembly of claim 1 wherein the inflatable member includes an inflatable volume and a retention portion, and wherein the support member includes a retainer element engaged with the retention portion to at least restrict motion of the inflatable member relatable to the support member.

7. The assembly of claim 1, further comprising:
   a motor;
   a first drive element operatively coupled to the motor; and
   a second drive element carried by the support member and engaged with the first drive element.

8. The assembly of claim 7 wherein activation of the motor rotates the support member relative to the carriage.

9. The assembly of claim 1 wherein the support member is releasably carried by the carriage and is movable relative to the carriage between a first position in which the support member is carried by the carriage and a second position in which the support member is not carried by the carriage.

10. The assembly of claim 9 wherein the carriage includes an arm movable between a first position in which the arm is operably engaged with the support member and a second position in which the arm is disengaged from the support member.

11. The assembly of claim 1, further comprising a friction weld head positioned proximate to the carriage for access to a workpiece carried by the support member.

12. The assembly of claim 11, wherein the carriage is a first carriage, the support member is a first support member, the body is a first body, and the inflatable member is a first inflatable member positioned to expand in a radially inward direction from the first configuration to the second configuration, and wherein the assembly further comprises:
   a second carriage, wherein at least one of the first and second carriages is movable toward and away from the other; and
   a generally ring-shaped second support member carried by the second carriage, the second support member including:
   a second body; and
   at least one second inflatable member carried by the second body and positioned to expand radially inwardly from a third configuration to a fourth configuration.

13. The assembly of claim 1 wherein the support member includes a complete ring.

14. A friction welding system, comprising:
   a friction welding head;
   a motion path positioned proximate to the friction welding head;
   a first translating support positioned on the motion path to carry a first welding workpiece;
   a second translating support positioned on the motion path to carry a second welding workpiece;
   a motor, assembly powering two first drive elements; and
   a rotating support assembly positioned along the motion path proximate to the friction welding head, the rotating support assembly including:
   a first carriage having a first roller;
   a first drive ring carried by the first carriage and rotatably engaged with the first roller;
   a second carriage having a second roller;
   a second drive ring carried by the second carriage and rotatably engaged with the second roller; wherein
   each of the first and second drive rings includes a cylindrical body, at least one inflatable member carried by the cylindrical body and inflatable to expand radially inwardly from a first configuration to a second configuration, at least one roller track carried by the cylindrical body and positioned radially outwardly from the at least one inflatable member to engage with a corresponding one of the first and second rollers, and a second drive element rotatably engaged with a corresponding one of the first drive elements.

15. The system of claim 14 wherein the first drive elements include gears and wherein the second drive elements include first flange-mounted roller bearings carried by the first drive ring and engaged with the one of the gears and second flange-mounted roller bearings carried by the second drive ring and engaged with another of the gears.

16. A support assembly for processing workpieces, comprising:
- a first carriage and a second carriage, wherein at least one of the first and second carriages is movable toward and away from the other,
- a generally ring-shaped first support member carried by the first carriage, the first support member including:
  - a first body; and
  - at least one first inflatable member carried by the first body and positioned to expand in a radially inward direction from a first configuration to a second configuration for engaging a workpiece; and
- a friction weld head positioned proximate to the carriage for access to a workpiece carried by the support member; and
- a generally ring-shaped second support member carried by the second carriage, the second support member including:
  - a second body; and
- at least one second inflatable member carried by the second body and positioned to expand radially inwardly from a third configuration to a fourth configuration.

* * * * *

UNITED STATES PATENT AND TRADEMARK OFFICE
CERTIFICATE OF CORRECTION

| | | |
|---|---|---|
| PATENT NO. | : 8,534,530 B2 | Page 1 of 1 |
| APPLICATION NO. | : 13/456118 | |
| DATED | : September 17, 2013 | |
| INVENTOR(S) | : David M. Biggs | |

It is certified that error appears in the above-identified patent and that said Letters Patent is hereby corrected as shown below:

Specification

In column 2, line 7, delete "technology" and insert -- technology. --, therefor.

Claims

In column 12, line 45, in claim 14, delete "motor," and insert -- motor --, therefor.

In column 13, line 8, in claim 16, delete "other," and insert -- other; --, therefor.

Signed and Sealed this
Twenty-fourth Day of November, 2015

Michelle K. Lee
*Director of the United States Patent and Trademark Office*